United States Patent
Fisher et al.

(10) Patent No.: US 7,585,436 B2
(45) Date of Patent: Sep. 8, 2009

(54) POLYMER FILMS COMPRISING STABILIZED INFRARED ABSORBING AGENTS

(75) Inventors: William Keith Fisher, Suffield, CT (US); Bruce Edward Wade, West Springfield, MA (US); Paul Daniel Garrett, Sturbridge, MA (US)

(73) Assignee: Solutia Incorporated, St. Louis, MO (US)

( * ) Notice: Subject to any disclaimer, the term of this patent is extended or adjusted under 35 U.S.C. 154(b) by 96 days.

(21) Appl. No.: 11/300,239

(22) Filed: Dec. 14, 2005

(65) Prior Publication Data

US 2007/0135534 A1 Jun. 14, 2007

(51) Int. Cl.
| | |
|---|---|
| *F21V 9/04* | (2006.01) |
| *F21V 9/00* | (2006.01) |
| *C08L 63/00* | (2006.01) |
| *C08L 67/02* | (2006.01) |
| *C08K 3/10* | (2006.01) |
| *C08K 3/38* | (2006.01) |
| *B32B 27/20* | (2006.01) |
| *B32B 27/36* | (2006.01) |
| *B32B 27/38* | (2006.01) |

(52) U.S. Cl. .................. 252/587; 252/582; 523/445; 523/457

(58) Field of Classification Search .................. None
See application file for complete search history.

(56) References Cited

U.S. PATENT DOCUMENTS

| | | | |
|---|---|---|---|
| 5,529,848 A | 6/1996 | D'Errico | |
| 5,529,849 A | 6/1996 | D'Errico | |
| 6,221,945 B1 | 4/2001 | Hiroko | |
| 6,620,872 B2 | 9/2003 | Fisher | |
| 6,663,950 B2 | 12/2003 | Barth | |
| 6,859,310 B2 | 2/2005 | Simpson | |
| 6,891,667 B2 | 5/2005 | Simpson | |
| 6,911,254 B2 | 6/2005 | Fisher | |
| 2003/0054160 A1* | 3/2003 | Fisher et al. | ................ 428/328 |
| 2003/0224182 A1 | 12/2003 | Simpson | |
| 2003/0232181 A1 | 12/2003 | Simpson | |
| 2004/0218260 A1 | 11/2004 | Simpson | |
| 2004/0234778 A1 | 11/2004 | Fukatani | |
| 2005/0079340 A1 | 4/2005 | Barth | |
| 2005/0134959 A1 | 6/2005 | Simpson | |
| 2005/0161642 A1 | 7/2005 | Takeda | |
| 2007/0048519 A1 | 3/2007 | Anderson | |
| 2007/0134499 A1* | 6/2007 | Fisher et al. | ................ 428/413 |

FOREIGN PATENT DOCUMENTS

| | | |
|---|---|---|
| EP | 0631861 | 1/1995 |
| EP | 1008564 | 6/2000 |
| EP | 1541012 | 6/2005 |
| EP | 1559743 | 8/2005 |
| GB | 2007-135073 | 12/2006 |

* cited by examiner

*Primary Examiner*—Michael J Feely
(74) *Attorney, Agent, or Firm*—Brenc Law

(57) ABSTRACT

The present invention includes polymer films that comprise lanthanum hexaboride and an epoxy agent. The lanthanum hexaboride and epoxy agent can be incorporated into or onto a polymer film in any suitable manner. The addition of an epoxy agent surprisingly provides a stabilization effect to the lanthanum hexaboride, which allows for the production of polymer films that advantageously absorb infrared radiation and resist environmental degradation. Polymer films thus produced have a significant number of applications, for example, but not limited to, display devices, protective coverings, and glazing film applications.

5 Claims, No Drawings

POLYMER FILMS COMPRISING STABILIZED INFRARED ABSORBING AGENTS

FIELD OF THE INVENTION

The present invention is in the field of polymer films comprising infrared absorbing agents, and, more specifically, the present invention is in the field of polymer films, such as window films, comprising infrared absorbing agents that selectively absorb infrared radiation.

BACKGROUND

Polymer films in general, and window films in particular, can be used in many applications to provide performance enhancement to an associated device, material, glazing, or other item. For example, display devices such as plasma displays, cathode ray tubes, and light emitting diode devices can all be enhanced with the incorporation of a polymer film. Films can also be applied to surfaces of other materials, such as shades and blinds, to provide various character enhancements.

One particularly common use of polymer films is as an enhancement layer on a glazing or within a multiple layer glazing panel. Polymer films can be applied to a glazing, for example a window, either at the time of manufacture or anytime thereafter. For example, polymer films can be retrofitted to existing windows by using an adhesive to bond a polymer film directly to the exposed surface of a window. Retrofitted applications are particularly useful for improving the solar transmission characteristics of a window.

The ability to reduce transmission of infrared radiation, and specifically near infrared radiation, can be a particularly desirable characteristic of a polymer film, and particularly for polymer films that are used in architectural applications. Reducing the transmission of infrared radiation can result in the reduction of heat generated by such radiation within an enclosed space.

There are many examples in the polymer arts of compositions and methods that reduce infrared radiation transmission. Included among these is the use of agents that selectively absorb radiation in the infrared region. One effective, known agent is lanthanum hexaboride ($LaB_6$). Lanthanum hexaboride, while an excellent selective absorber of near infrared radiation, is subject to molecular degradation due to commonly encountered environmental conditions, which compromise its infrared absorbing ability.

Further improved compositions and methods are needed to enhance the characteristics of polymer films comprising infrared absorbing agents, and, specifically, polymer films comprising lanthanum hexaboride, so as to impart stability without detrimentally affecting optical qualities.

SUMMARY OF THE INVENTION

The present invention includes polymer films that comprise lanthanum hexaboride and an epoxy agent. The lanthanum hexaboride and epoxy agent can be incorporated into or onto a polymer film in any suitable manner. The addition of an epoxy agent surprisingly provides a stabilization effect to the lanthanum hexaboride, which allows for the production of polymer films that advantageously absorb infrared radiation and resist environmental degradation. Polymer films thus produced have a significant number of applications, for example, but not limited to, display devices, protective coverings, and glazing film applications.

DETAILED DESCRIPTION

The present invention involves polymer films comprising infrared absorbing agents and their devices, materials, and glazings comprising those polymer films. As disclosed herein, lanthanum hexaboride and an epoxy agent are incorporated into or onto polymer films that are useful as performance enhancing layers for various applications. As will be described in detail below, polymer films of the present invention can comprise any suitable polymer, and, in preferred embodiments, polymer films comprise poly(ethylene terephthalate).

Previous attempts in the art to reduce infrared radiation include using various infrared reflective layers (see, for example, U.S. Pat. Nos. 6,391,400, 5,245,468, and 2002/0150744) or various infrared absorbing agents that are distributed on or within polymeric layers (see, for example, U.S. Pat. Nos. 6,737,159, 6,506,487, 6,620,872, 6,673,456, 2002/0054993, 2003/0094600, 2003/0122114, 2003/0054160, and International Patent Application WO002/077081). The use of infrared absorbing agents can present several difficulties, among which is the gradual degradation of those agents due to environmental conditions, such as, for example, high moisture conditions or acidic conditions.

The present invention includes polymer films comprising lanthanum hexaboride and an epoxy agent. Lanthanum hexaboride and epoxy agents of the present invention can be disposed on or within a polymer film.

Polymer Film

As used herein, a "polymer film" means a relatively thin polymer layer that functions as a performance enhancing layer and that can readily be bonded to a material, device, or multiple layer glass panel. Poly(ethylene terephthalate) is most commonly used as a polymer film.

In various embodiments, a polymer film layer has a thickness of 0.01 millimeters to 0.30 millimeters, 0.013 millimeters to 0.20 millimeters, or 0.025 millimeters to 0.1 millimeters. Other thicknesses, of course, are useful, and can be chosen based upon the particular application.

Polymer films of the present invention include, for example, a multi-layer stack for reflecting infrared solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side). In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers, and the like. In various embodiments, the polymer film layer comprises materials such as re-stretched thermoplastic films having the noted properties, which include polyesters, for example poly(ethylene terephthalate) and poly(ethylene terephthalate) glycol-modified (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or an antifog layer, as are known in the art, and as are described below.

Hardcoats

Any suitable, conventional hardcoat can be used as a scratch resistant layer on a polymer film of the present invention. In particular, the hardcoats may be a combination of poly(silicic acid) and copolymers of fluorinated monomers, with compounds containing primary alcohols (as described in U.S. Pat. No. 3,429,845), or with compounds containing primary or secondary alcohols (as described in U.S. Pat. No. 3,429,846). Other abrasion resistant coating materials suitable for the purpose are described in U.S. Pat. Nos. 3,390,203; 3,514,425; and, 3,546,318.

Further examples of useful hardcoats include cured products resulting from heat or plasma treatment of a hydrolysis and condensation product of methyltriethoxysilane.

Hardcoats that are useful also include acrylate functional groups, such as a polyester, polyether, acrylic, epoxy, urethane, alkyd, spiroacetal, polybutadiene or polythiol polyene resin having a relatively low molecular weight; a (meth)acrylate oligomer or prepolymer of a polyfunctional compound such as a polyhydric alcohol; or a resin containing, as a reactive diluent, a relatively large amount of a monofunctional monomer such as ethyl (meth)acrylate, ethylhexyl (meth)acrylate, styrene, methylstyrene or N-vinylpyrrolidone, or a polyfunctional monomer such as trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate.

In various embodiments, acrylate hard coats are preferred, and particularly urethane acrylates.

Lanthanum Hexaboride

The preparation of lanthanum hexaboride and its incorporation into or onto polymeric substrates is well known in the art (see, for example, U.S. Pat. Nos. 6,620,872 and 6,911,254). Lanthanum hexaboride is available, for example, as a dispersion of solid particles in liquid, with zirconium and dispersion agents included as appropriate.

Lanthanum hexaboride can be incorporated into polymer films of the present invention in any suitable amount, and will generally be incorporated in an amount that is sufficient to provide the desired near infrared absorbance without also excessively impacting optical performance. In various embodiments, lanthanum hexaboride is incorporated into polymer films in amounts of 0.01 to 0.2 weight percent, 0.01 to 0.15 weight percent, or 0.01 to 0.1 weight percent. In embodiments in which other infrared absorbers are used, the amount of lanthanum hexaboride can be reduced appropriately. Examples of other useful infrared absorbers include indium tin oxide and doped tin oxide, among others. In embodiments in which lanthanum hexaboride is distributed in a binder layer or a hard coat, lanthanum hexaboride is, in various embodiments, incorporated into polymer films at less than 3% by weight, preferably less than 2%, and more preferably between 0.5%-2%

Lanthanum hexaboride can be incorporated into polymer films by directly mixing with polymeric precursors prior to film formation. Lanthanum hexaboride can be incorporated onto poly(ethylene terephthalate) films, by, for example, spray techniques, gravure techniques, or dipping techniques, among others. In other embodiments, lanthanum hexaboride can be incorporated into a hard coat material, as described elsewhere herein in detail. Hard coats are often employed with polymer films to enhance scratch resistance and other characteristics (see, for example, U.S. Pat. No. 6,663,950). In other embodiments, lanthanum hexaboride can be incorporated into a binder material that is used to bind two polymer films together to form a multiple layer film, as is well known in the art.

Lanthanum hexaboride that is useful in the present invention can be nano-sized, ground particles, for example, less than 250 nanometers, less than 200 nanometers, less than 150 nanometers, or less than 100 nanometers in size.

In various embodiments, lanthanum hexaboride can be combined with antimony tin oxide, indium tin oxide, or tin oxide, and added to a binder layer or hardcoat of a polymer film.

In these embodiments, antimony tin oxide is preferably used, and the binder layer or hardcoat contains 30-60% by weight of antimony tin oxide, preferably 50-60% by weight of antimony tin oxide, and less than 3% by weight of lanthanum hexaboride, preferably less than 2%, and more preferably between 0.5%-2%. In a preferred embodiment, the weight percent of lanthanum hexaboride is 1.08%-3.53% the total weight percent of the sum of lanthanum hexaboride and antimony tin oxide.

Epoxy Agents

Any suitable epoxy agent can be used with the present invention, as are known in the art (see, for example, U.S. Pat. Nos. 5,529,848 and 5,529,849).

In various embodiments, epoxy compositions found usable as hereinafter described are selected from (a) epoxy resins comprising mainly the monomeric diglycidyl ether of bisphenol-A; (b) epoxy resins comprising mainly the monomeric diglycidyl ether of bisphenol-F; (c) epoxy resins comprising mainly the hydrogenated diglycidyl ether of bisphenol-A; (d) polyepoxidized phenol novolacs; (e) diepoxides of polyglycols, alternatively known as an epoxy terminated polyether; and (f) a mixture of any of the foregoing epoxy resins of (a) through (e) (see the Encyclopedia of Polymer Science and Technology, Volume 6, 1967, Interscience Publishers, N.Y., pages 209-271).

A suitable commercially available diglycidyl ether of bisphenol-A of class (a) is DER 331 from Dow Chemical Company. A diglycidyl ether of bisphenol-F epoxy of class (b) is EPON Resin DPL-862 and a hydrogenated diglycidyl ether of bisphenol-A epoxy of class (c) is EPONEX Resin 1510, both of which are available from Shell Chemical Company. A polyepoxidized phenol formaldehyde novolac of class (d) is available from Dow Chemical as DEN 431. A diepoxide of poly(oxypropylene) glycol of class (e) is available from Dow Chemical as DER 732.

Further examples of suitable epoxy agents include 3,4-epoxycyclohexane carboxylate compositions of the type described in U.S. Pat. No. 3,723,320. Also useful are diepoxides such as those disclosed in U.S. Pat. No. 4,206,067 that contain two linked cyclohexane groups to each of which is fused an epoxide group. Such diepoxide compounds correspond to the formula:

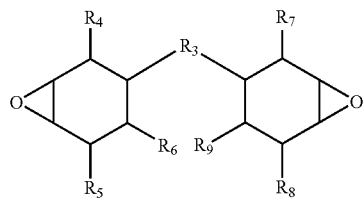

wherein $R_3$ is an organic group containing 1 to 10 carbon atoms, from 0 to 6 oxygen atoms, and from 0 to 6 nitrogen atoms, and $R_4$ through $R_9$ are independently selected from among hydrogen and aliphatic groups containing 1 to 5 carbon atoms. Exemplary diepoxides include 3,4-epoxycyclohexylmethyl-3,4-epoxycyclohexane, bis (3,4-epoxy-6-methylcyclohexylmethyl adipate), and 2-(3,4-epoxycyclohexyl)-5,5-spiro(3,4-epoxy)cyclohexane-m-dioxane.

A further useful epoxy is 2-ethylhexyl glycidyl ether (available from Resolution Products, Houston Tex., as Heloxy Modifier 116).

Further useful epoxies include diepoxides of poly(oxypropylene) glycol, 2-ethylhexyl glycidyl ether, and diepoxide products of epichlorohydrin and polypropylene glycol.

Mixtures of epoxy agents can also be used.

Epoxy agents can be incorporated in any suitable amount, with the type of epoxy agent or agents, the composition of the polymer film, and the amount of lanthanum hexaboride factoring into the determination. Epoxy agents will generally be incorporated along with the lanthanum hexaboride, for example within a film, deposited on a film, within a hardcoat of a film, or in a binder that binds two polymer films together into a multiple layer film.

In various embodiments, epoxy agents are incorporated at a weight percent of 0.05 to 10.0, 0.1 to 5.0, 0.5 to 4.0, or 1.0 to 3.5 weight percent of a polymer film. These values can be combined with the values given above for lanthanum hexaboride in any combination, as is desired for any particular application.

In embodiments in which an epoxy agent is incorporated into a binder layer or hardcoat, the epoxy agent can be present, in various embodiments, at 0.3 to 2.5% weight percent or 0.2 to 3.0 weight percent.

Polymer films of the present invention can be used in any suitable display device. For example, cathode ray tubes, plasma display panels, light emitting diode displays, and other flat panel monitors, among others. In various embodiments, polymer films of the present invention can be applied directly to any of these devices using an adhesive or bonding layer, as are well known in the art.

In further embodiments, polymer films of the present invention can be applied to shades, blinds, fabrics, and other materials. In these embodiments, for example, polymer films of the present invention can prevent the discoloration, aging, and general weakening of the underlying material.

In further embodiments of the present invention, polymer films are applied to the exterior surface of a glass pane or laminated glass panel, including the inner surfaces of a two or more pane insulated glass unit. Application of the polymer film can be performed during manufacturing, or retroactively after installation of the window. In various embodiments, polymer films used for these surface applications have a hardcoat to prevent or reduce mechanical damage to the underlying polymer layer.

In yet further embodiments, polymer films of the present invention are incorporated into a multiple layer glazing panel. These laminated panels are also referred to as "safety glass," and typically comprise two or more layers of a rigid substrate, such as glass or rigid plastic, between which are disposed one or more layers of a relatively thick polymer sheet. The polymer sheet material can be any suitable polymer, and is commonly poly(vinyl butyral). Other useful materials include polyurethane, poly(vinyl chloride), poly(ethylene vinyl acetate), combinations thereof, and the like. Safety glass manufacturing methods and compositions are well known in the art. Polymer films of the present invention can be incorporated into a laminated glazing panel in any suitable way, for example, between two polymer sheets. With appropriate adhesives or bonding layers, polymer films can also be incorporated into laminated glazing panels adjacent one of the rigid layers and on the inside of the panel.

In other embodiments of the present invention, polymer films of the present invention are used in bilayers. As used herein, a bilayer is a multiple layer construct having a rigid substrate, such as glass or acrylic, and a polymer film of the present invention, with a "polymer stack" disposed between the rigid substrate and the polymer film. The polymer stack can be a single polymer sheet, or combinations of polymer sheets and polymer films. The resulting bilayer structure has only a single rigid substrate, such as glass, which results in a laminated glazing construct that is lighter than a two or more pane glazing. A typical bilayer construct is: (glass)//(polymer sheet)//(polymer film). The infrared absorbing agents of the present invention are particularly useful for bilayers because the exposed polymer film typically allows moisture ingress through the polymer film and into the polymer sheet. Bilayer constructs include, for example and without limitation:

(Glass)//((polymer sheet)$_h$//(polymer film))$_g$
(Glass)//(polymer sheet)$_h$//(polymer film)

where h is 1 to 10, and, in various embodiments, is less than 3, and g is 1 to 5, and, in various embodiments, is less than 3.

In further embodiments, polymer films can be incorporated into a spall shield, for example and without limitation:

(Multiple Layer Glazing panel)//((polymer sheet)$_h$//(polymer film))$_g$
(Multiple Layer Glazing panel)//(polymer sheet)$_h$//(polymer film)

where h is 1 to 10, and, in various embodiments, is less than 3, and g is 1 to 5, and, in various embodiments, is less than 3.

In addition to the lanthanum hexaboride and epoxy agents of the present invention, one or more conventional infrared absorbing agents or infrared reflecting layers can be incorporated into polymer sheets of the present invention, or other layers, such as polymer sheets, in multiple layer embodiments.

In various embodiments, solar control glass (solar glass) is used for one or more multiple layer glass panels of the present invention. Solar glass can be any conventional glass that incorporates one or more additives to improve the optical qualities of the glass, and specifically, solar glass will typically be formulated to reduce or eliminate the transmission of undesirable wavelengths of radiation, such as near infrared and ultraviolet. Solar glass can also be tinted, which results in, for some applications, a desirable reduction of transmission of visible light. Examples of solar glass that are useful in the present invention are bronze glass, gray glass, low E (low emissivity) glass, and solar glass panels as are known in the art, including those disclosed in U.S. Pat. Nos. 6,737,159 and 6,620,872. Rigid substrates other than glass can be used, and in some embodiments, the rigid substrate is a rigid plastic having a glass transition temperature above 60° C. or 70° C., for example polycarbonates and polyalkyl methacrylates, and specifically those having from 1 to 3 carbon atoms in the alkyl moiety.

In various embodiments of the present invention, lanthanum hexaboride and epoxy agents of the present invention are disbursed on or within a polymer sheet and/or a polymer film. The concentration of lanthanum hexaboride and epoxy agents, and the ratio between them, can be adjusted to suit the needs of the particular application. Generally, lanthanum hexaboride levels will be sufficient to impart the desired infrared absorbance on the sheet and epoxy agents will be included in an amount sufficient to provide the desired stability, depending on the application.

In various embodiments, a polymer sheet of the present invention comprising lanthanum hexaboride and an epoxy agent absorbs at least 5%, at least 15%, at least 25%, at least 50%, at least 75%, or at least 90% of the infrared radiation between 700 nanometers and 2,000 nanometers while transmitting at least 60%, at least 70%, at least 80%, at least 90%, or at least 95% of the visible light.

Also included in the present invention are stacks or rolls of any of the polymer films of the present invention disclosed herein in any combination.

The present invention also includes windshields, windows, and other finished glazing products comprising any of the polymer films of the present invention.

The present invention includes methods of manufacturing interlayers and glazing panels comprising forming an interlayer or glazing panel of the present invention using any of the polymer films of the present invention described herein.

Also included herein within the scope of the present invention are methods of reducing transmission of infrared and/or near infrared radiation through an opening, comprising the step of disposing in said opening any of the polymer film constructs of the present invention, for example, within a windshield or glazing panel.

The present invention also includes methods of retrofitting an existing glazing to improve optical quality, comprising applying to the glazing any of the polymer films of the present invention.

The present invention also includes devices and materials incorporating a polymer film of the present invention.

By virtue of the present invention, it is now possible to provide polymer films, such as poly(ethylene terephthalate) film, and other polymer film, with superior, selective infrared transmission reduction characteristics, that are resistant to degradation caused by environmental factors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer film can be formed comprising lanthanum hexaboride in any of the ranges given in addition to comprising epoxy agents in any of the ranges given, where appropriate, to form many permutations that are within the scope of the present invention, but that would be cumbersome to list.

Any figure reference numbers given within the abstract or any claims are for illustrative purposes only and should not be construed to limit the claimed invention to any one particular embodiment shown in any figure.

Figures are not drawn to scale unless otherwise indicated.

Each reference, including journal articles, patents, applications, and books, referred to herein is hereby incorporated by reference in its entirety.

We claim:

1. A poly(ethylene terephthalate) film, comprising:
   lanthanum hexaboride; and
   an epoxy agent;
   wherein said poly(ethylene terephthalate) film has a thickness of 0.01 millimeters to 0.30 millimeters; wherein said lanthanum hexaboride and said epoxy agent are disposed in said poly(ethylene terephthalate) film; and wherein said epoxy agent is selected from the group consisting of diepoxides of poly(oxypropylene) glycol, 2-ethylhexyl glycidyl ether, and diepoxide products of epichlorohydrin and polypropylene glycol.

2. The polymer film of claim 1, wherein said epoxy agent is Present in an amount of 0.05 to 10.0 weight percent of said film.

3. The polymer film of claim 1, wherein said epoxy agent is present in an amount of 0.5 to 4.0 weight percent of said film.

4. The polymer film of claim 1, wherein said lanthanum hexaboride is present in an amount of 0.01 to 0.2 weight percent of said film.

5. The polymer film of claim 1, wherein said lanthanum hexaboride is present in an amount of 0.01 to 0.15 weight percent of said film.

* * * * *

UNITED STATES PATENT AND TRADEMARK OFFICE
CERTIFICATE OF CORRECTION

PATENT NO. : 7,585,436 B2  Page 1 of 1
APPLICATION NO. : 11/300239
DATED : September 8, 2009
INVENTOR(S) : Fisher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 195 days.

Signed and Sealed this

Fourteenth Day of September, 2010

David J. Kappos
*Director of the United States Patent and Trademark Office*